United States Patent
Liu

(10) Patent No.: US 7,768,945 B2
(45) Date of Patent: Aug. 3, 2010

(54) METHOD AND ACCESS APPARATUS FOR ACCESSING BROADBAND VIDEO SERVICE

(75) Inventor: Chenglong Liu, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 297 days.

(21) Appl. No.: 11/781,593

(22) Filed: Jul. 23, 2007

(65) Prior Publication Data

US 2007/0286193 A1    Dec. 13, 2007

Related U.S. Application Data

(63) Continuation of application No. PCT/CN2005/002169, filed on Dec. 13, 2005.

(30) Foreign Application Priority Data

Jan. 24, 2005    (CN)  ........................ 2005 1 0001610

(51) Int. Cl.
*H04L 12/28* (2006.01)
(52) U.S. Cl. ..................................................... 370/254
(58) Field of Classification Search ................. 370/390, 370/461, 486
See application file for complete search history.

(56) References Cited

U.S. PATENT DOCUMENTS

| | | | |
|---|---|---|---|
| 6,970,461 B2 | 11/2005 | Unitt et al. | |
| 7,237,111 B2 | 6/2007 | Shin et al. | |
| 7,327,730 B2 * | 2/2008 | Chen et al. | 370/390 |
| 2003/0046706 A1 * | 3/2003 | Rakib | 725/111 |
| 2004/0059803 A1 | 3/2004 | Heng | |
| 2004/0107443 A1 * | 6/2004 | Clancy | 725/100 |
| 2004/0228291 A1 | 11/2004 | Huslak et al. | |
| 2004/0240466 A1 * | 12/2004 | Unitt et al. | 370/461 |
| 2004/0255118 A1 * | 12/2004 | Shin et al. | 713/168 |
| 2004/0261094 A1 * | 12/2004 | Huslak et al. | 725/25 |

FOREIGN PATENT DOCUMENTS

CN           1483258 A       3/2004

OTHER PUBLICATIONS

Chinese Office Action (Dec. 18, 2009).
Chinese Office Action (Jun. 8, 2007).
Chinese Office Action (Aug. 31, 2007).
PCT Written Opinion of the International Searching Authority (Mar. 16, 2006).

* cited by examiner

*Primary Examiner*—Robert W Wilson
(74) *Attorney, Agent, or Firm*—Leydig, Voit & Mayer, Ltd.

(57) ABSTRACT

The present invention provides a method for accessing broadband video service, including: determining a port of an access apparatus, wherein the port receives a video program request carrying a requested multicast program IP address; determining a permissible program list corresponding to the port of the access apparatus according to preset relations between ports and permissible program lists, wherein at least one of program numbers is recorded in the permissible program list; determining multicast program IP addresses corresponding to the program numbers; and requesting a video flow from the requested multicast program IP address when the requested multicast program IP address is in the multicast program IP addresses corresponding to the program numbers. The present invention also provides an access apparatus. Using of the method and the access apparatus allows taking control of user accessing video program under the broadband video service.

17 Claims, 3 Drawing Sheets

METHOD AND ACCESS APPARATUS FOR ACCESSING BROADBAND VIDEO SERVICE

This application is a continuation of International Patent Application No. PCT/CN2005/002169, filed Dec. 13, 2005, which claims priority to Chinese Patent Application No. 200510001610.4, filed Jan. 24, 2005, all of which are hereby incorporated by reference.

FIELD OF THE TECHNOLOGY

The present invention relates to technologies concerning broadband video services, and more particularly, to a method and an access apparatus for accessing broadband video service.

BACKGROUND OF THE INVENTION

Along with the remarkable development of broadband techniques such as x Digital Subscriber Line (xDSL), there were over 15 million broadband network users in China in 2003. At present, conventional broadband networks are primarily used for bearing data services. Video services are basically virgin ground in the conventional broadband networks. However, the video services will become a new kind of services principal for telecommunication operators to attract broadband users. The technologies of the video service are now being updated and developed, and some of the key technologies of the broadband video service are user authentication and authority control.

Currently, the broadband video service has such modes as Video on Demand (VoD), Near Video On Demand (NVOD), and Internet Group Management Protocol (IGMP), and multimedia flow is transferred in a multicast form. At present, the multicast is mostly controlled based on protocols, which makes it difficult to flexibly control the authority of multicast users, thus limiting the development of the broadband video service.

SUMMARY OF THE INVENTION

In view of the above, the present invention provides a method and an access apparatus for accessing broadband video service, in order to control the access of users to video services flexibly.

A method for accessing broadband video service includes:

determining a port of an access apparatus, wherein the port receives a video program request carrying a requested multicast program IP address;

determining a permissible program list corresponding to the port of the access apparatus according to preset relations between ports and permissible program lists, wherein at least one of program numbers is recorded in the permissible program list;

determining multicast program IP addresses corresponding to the program numbers; and requesting a video flow from the requested multicast program IP address when the requested multicast program IP address is in the multicast program IP addresses corresponding to the program numbers.

An access apparatus for accessing broadband video service includes:

a first module, for determining a port of the access apparatus, wherein the port receives a video program request carrying a requested multicast program IP address;

a second module, for determining a permissible program list corresponding to the port of the access apparatus according to preset relations between ports and permissible program lists, wherein at least one of program numbers is recorded in the permissible program list;

a third module, for determining multicast program IP addresses corresponding to the program numbers; and a fourth module, for requesting a video flow from the requested multicast program IP address when the requested multicast program IP address is in the multicast program IP addresses corresponding to the program numbers, and forwarding the video flow from the requested multicast program IP address to the port of the access apparatus.

It can be seen that from the solution provided in the present invention, a flexible configuration among user authority, apparatus favorable charging modes, apparatus ports, and multicast programs is implemented, and thus the access of users to video services is controlled flexibly. To be specific, in the present invention, the access control is supplied by the access apparatus near the user side, thereby the problems of video user authentication and authority control is solved.

DETAILED DESCRIPTION OF THE INVENTION

Figure 1:
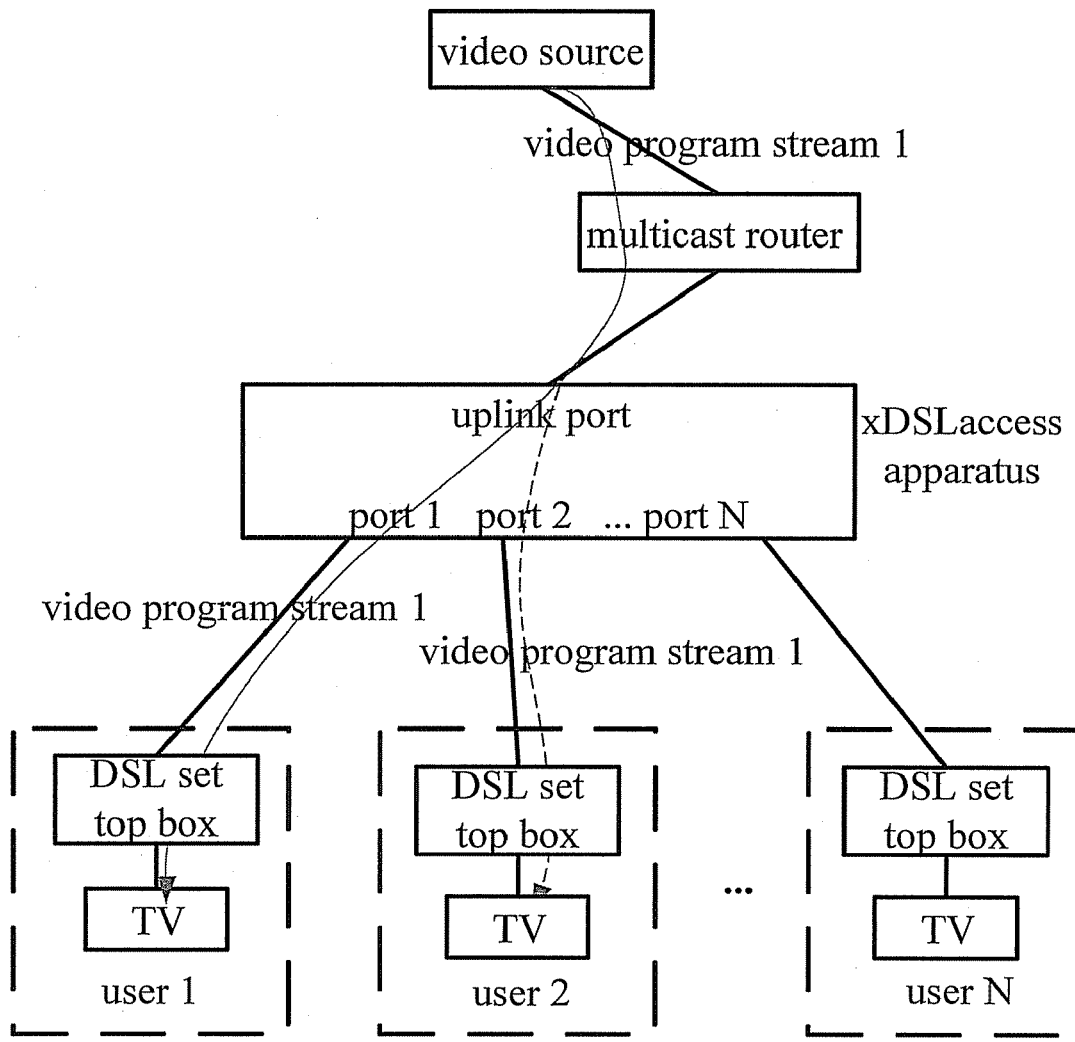
FIG. 1 is a schematic diagram illustrating a video broadcast in a broadband access network.
Figure 2:
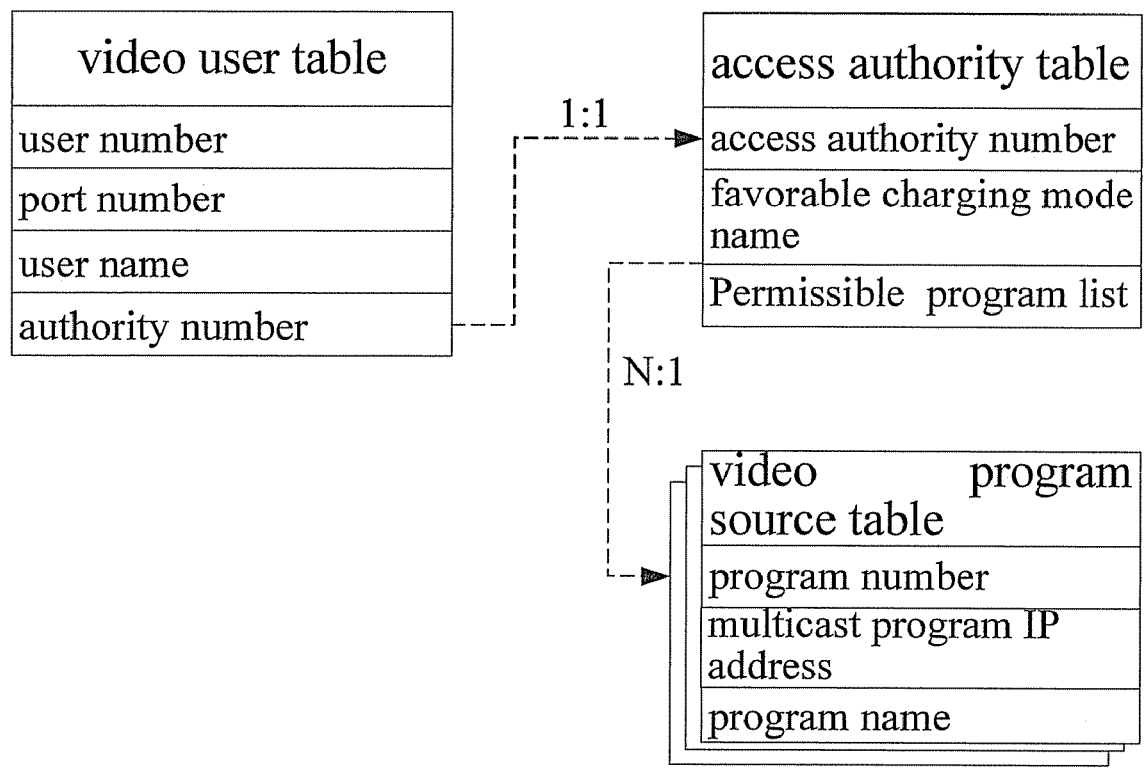
FIG. 2 is a schematic diagram illustrating interface tables and a relation among the interface tables.

FIG. 1 is a schematic diagram illustrating a video broadcast in a broadband access network with an xDSL access mode. The networking in FIG. 1 is taken as an example to describe the control technique of accessing a broadband video service according to the present invention. Interface tables are configured in the xDSL access apparatus in the embodiments. With reference to FIG. 2, the interface tables include a video program source table, an access authority table, and a video user table.

The entries of the video program source table include a program number, a multicast program IP address and a program name.

The program number is used to search program, and quickly find and designate a program.

The multicast program IP address corresponds to a server address, i.e., program source, and the server address is a D class IP address. The video programs are differentiated by the multicast addresses. Each video program corresponds to a multicast address, i.e., each video program corresponds to a D class IP address. When a user requests a video program, the xDSL access apparatus sends a video program request, e.g., IGMP request, to an IP address corresponding to the video program, and the video flow is obtained from the server corresponding to the IP address.

The program name, i.e., the name of a video program, is used to visually describe a video program, e.g., CCTV, ABC, thereby facilitating the maintenance and the management of video programs.

The entries of the access authority table include an access authority number, a favorable charging mode name, and a permissible program list.

The access authority number is used to identify a favorable charging mode, and corresponds to an authority number in the video user table.

The favorable charging mode name visually indicates a type of charging mode, so as to facilitate the management.

Users may customize an appropriate telecommunication traffic service based on different charging modes, such as fixed expenses every month, time period with low expenses, time policy for low expenses, etc. The telecommunication traffic service may be combined with the charging mode. For example, the operator may provide varied favorable charging modes which have fixed expenses every month with varied charging modes, and the users may select one of the favorable charging modes according to their own interests. Then, the operator creates a permissible program list according to the video programs selected by the users, and sets authority numbers for the users to avoid illegal usurpation.

In the permissible program list, the bit string is used to identify the video program. Each bit string is used to identify a video program. In other words the bit string indicates that the user has the authority to access the video program. The set of all the bit strings is a list of all the permissible programs. In other words, a plurality of program numbers corresponding to the programs the user has the authority to access are stored in the permissible program list.

With the help of the access authority table, different users may request different video programs according to their authorities. Moreover, the access authority table may correspond to the favorable charging mode table, and the corresponding relation between the access authority table and the favorable charging mode table may be bound and set by the network manager, thus making it convenient for the service provider to set different favorable charging modes.

The entries of the video user table include a user number, a port number, a user name, and an authority number.

The user number is an index number assigned for a physical port of the xDSL access apparatus.

The port number corresponds to a physical port of the xDSL access apparatus via which the video program flow is received, and a physical port corresponds to a service user.

The user name visually describes a practical user, so that the configuration performed by the network manager is more convenient. Each user name corresponds to a user who is corresponding to a physical port of the access apparatus.

The authority number, which corresponds to the access authority number in the access authority table, may be directly linked to the service favorable charging mode selected by a user, or linked to the permissible program list corresponding to the user. By using the access authority number, the customization of the favorable charging mode and the bound relation of the service configuration are simplified.

A video user occupies an xDSL physical port, and the control of the xDSL physical port is the control of the video user. The mode for directly controlling the access authentication of the user is fit for the global service network operator, and it is simple and reliable, as well.

Before the access control of broadband video service by a user, appropriate configurations need to be made at first. For example, according to the actual requirement of the service, video programs to be played are determined, and a video program source table is worked out. A video program source table is created in the xDSL access apparatus to make each video program correspond to a D class IP address. Video programs are combined to form various favorable charging modes provided to users to select. User authority is determined, i.e., an access authority table is created in the xDSL access apparatus. In addition, the relation between the port and the authority number is set up in the xDSL access apparatus, i.e., a video user table is created.

Figure 3:
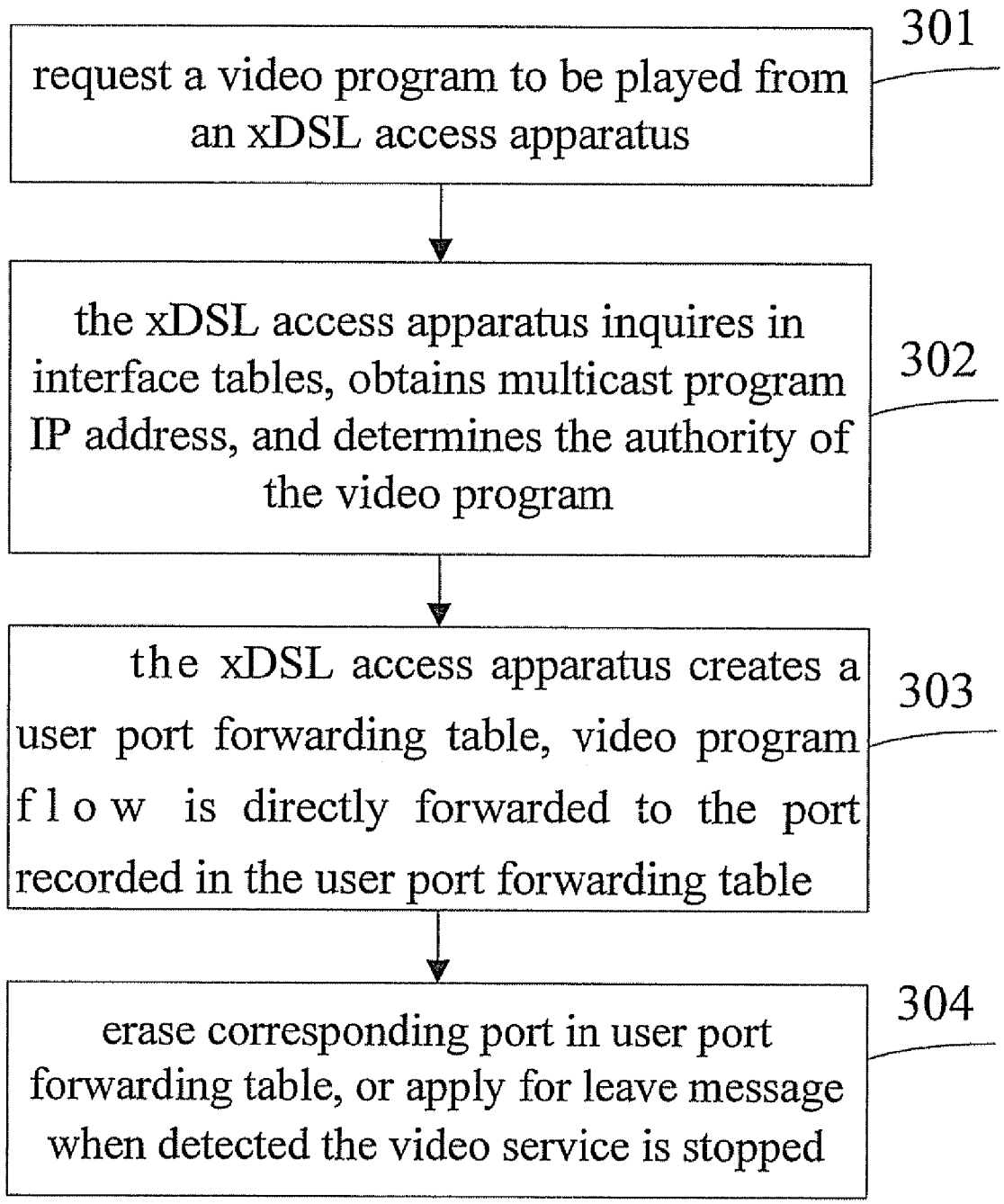
FIG. 3 is a flowchart illustrating the method for accessing a broadband video service.

With reference to the flowchart shown in FIG. 3, the method for accessing broadband video service according to the present invention is described hereinafter, taking a user requesting to play video programs as an example. The method includes the following steps.

At step 301, a user selects a video program to be played after the broadband video service is put into use. The user sends a video program request, e.g., an IGMP report request, to an xDSL access apparatus via an xDSL video set top box or other similar devices. The video program request includes a program number corresponding to the video program to be played, or the video program request, such as an IGMP report request, includes a multicast program IP address requested by the user.

At step 302, after receiving the video program request, the xDSL access apparatus inquires about the physical port receiving the video program request, inquires the video user table to obtain the authority number corresponding to the physical port, inquires the access authority table to obtain program numbers in the permissible program list corresponding to the authority number, and then inquires the video program table to obtain the multicast program IP addresses corresponding to the program numbers.

Meanwhile, determine whether the program number corresponding to the video program requested by the user is in the permissible program list when the video program request includes the program number, or determine whether the requested multicast program IP address is in the multicast program IP addresses corresponding to the program numbers when the video program request includes the multicast program IP address. If the program number corresponding to the video program requested by the user is not in the permissible program list corresponding to the physical port of the xDSL access apparatus, it is indicated that the user does not have the authority to access the video program, and then the video program request is directly discarded; if the user has the authority to access the video program, perform the following steps.

At step 303, the xDSL access apparatus sends an IGMP join message to the multicast program IP address, i.e., the multicast router, so as to apply for a video program flow. At the same time, a user port forwarding table is created, and the physical port occupied by the user is added in the table. The use port forwarding table corresponds to the requested program number in the video program source table. Subsequently, the video program flow is directly forwarded to the port in the user port forwarding table.

If other users occupying other ports have also successfully applied for the same program, the ports occupied by those users are added into the user port forwarding table.

At step 304, if a user shuts down the video terminal, or the xDSL access apparatus has not received the response message from a port in respect of regularly polling each port occupied by the designated video users via a IGMP query request message, the port is erased from the user port forwarding table created in the step 303, and the video flow is no longer copied for the port. If all the ports corresponding to a designated video program number are erased, an IGMP leave message of the designated video program is sent to a higher multicast router.

The access apparatus in the xDSL broadband network is merely taken as an example to describe the present invention. It is easily understood that the access apparatus in the xDSL broadband network may be replaced with other Local Area Network (LAN) access apparatuses and the like.

By means of the present invention, it is convenient to control the access authority of multicast users, and the broadband video service can be flexibly implemented.

The above descriptions are only preferred embodiments of the present invention and not for use in limiting the present invention.

The invention claimed is:

1. A method for accessing broadband video service, comprising:
   determining, by an access apparatus, a port of the access apparatus, wherein the port receives a video program request carrying a requested multicast program IP address;
   determining, by the access apparatus, an authority number corresponding to the port according to preset relations between ports of the access apparatus and authority numbers;
   determining, by the access apparatus, a permissible program list corresponding to the determined authority number according to preset relations between authority numbers and permissible program lists;
   obtaining, by the access apparatus, from the permissible program list, program numbers of video programs that a service user occupying the port has authority to access;
   determining, by the access apparatus, multicast program IP addresses corresponding to the program numbers; and
   requesting, by the access apparatus, a video flow from the requested multicast program IP address when the requested multicast program IP address is in the multicast program IP addresses corresponding to the program numbers.

2. The method of claim 1, further comprising:
   forwarding, by the access apparatus, the video flow from the requested multicast program IP address to the port of the access apparatus.

3. The method of claim 2, further comprising:
   creating, by the access apparatus, a user port forwarding table corresponding to the requested multicast program IP address, wherein the user port forwarding table records the port of the access apparatus;
   the forwarding the video flow to the port of the access apparatus comprising:
   inquiring, by the access apparatus, the user port forwarding table, and forwarding the video flow to the port of the access apparatus recorded in the user port forwarding table.

4. The method of claim 3, further comprising:
   detecting, by the access apparatus, a state of a user device corresponding to the port of the access apparatus recorded in the user port forwarding table;
   erasing, by the access apparatus, the port of the access apparatus recorded in the user port forwarding table when the user device corresponding to the port of the access apparatus is not capable of receiving the video flow.

5. The method of claim 4, wherein the detecting the state of the user device comprises:
   detecting, by the access apparatus, whether the user device corresponding to the port of the access apparatus is shutdown; or regularly polling each port recorded in the user port forwarding table; and
   determining, by the access apparatus, the user device is not capable of receiving the video flow when the user device is shutdown, or a response message of the polling has not been received.

6. The method of claim 5, further comprising:
   forwarding, by the access apparatus, a video program leave request to the multicast program IP address corresponding to the user port forwarding table when all the ports recorded in the user port forwarding table are erased.

7. The method of claim 1, further comprising:
   erasing, modifying or adding, by the access apparatus, the program numbers in the permissible program list and the authority numbers.

8. The method of claim 1, further comprising:
   charging, by the access apparatus, for a broadband video service according to preset relations between the authority numbers and charging modes.

9. The method of claim 1, further comprising:
   erasing, modifying or adding, by the access apparatus, the program numbers in the permissible program list.

10. A method for accessing broadband service, the method being performed in a processor of an access apparatus, and the method comprising:
    determining a port of the access apparatus, wherein the port receives a program request carrying a requested multicast program IP address;
    obtaining an authority number corresponding to the determined port by inquiring a first table;
    determining a permissible program list according to the obtained authority number in a second table, and obtaining authorized program numbers by inquiring the permissible program list in a second table;
    determining authorized multicast program IP addresses according to the obtained program numbers by inquiring a third table; and
    requesting a program flow from the requested multicast program IP address when the requested multicast program IP address is within the authorized multicast program IP addresses.

11. The method of claim 10, wherein the first table is a video user table preset in the access apparatus, and entries of the video user table comprises a port number of the port receiving the program request, and an authority number linked to the permissible program list.

12. The method of claim 11, wherein the second table is an access authority table preset in the access apparatus, and entries of access authority table comprises at least one permissible program list each of which corresponds to an authority number.

13. The method of claim 10, wherein the third table is a video program source table preset in the access apparatus, and entries of the video program source table comprises the program numbers and the authorized multicast program IP addresses.

14. An access apparatus for accessing broadband video service, comprising:
    at least one port; and
    a processor configured to perform the steps comprising:
    determining a physical port receiving a video program request, wherein the video program request carries a requested multicast program IP address;
    inquiring a video user table to obtain an authority number corresponding to the physical port;
    inquiring an access authority table to obtain permissible program numbers corresponding to the authority number;
    inquiring a video program table to obtain permissible multicast program IP addresses corresponding to the permissible program numbers; and
    determining whether the requested multicast program IP address is within the permissible multicast program IP addresses, if so, requesting a video flow from the requested multicast program IP address.

15. The access apparatus of claim 14, wherein the access apparatus further performs the steps of:

establishing a user port forwarding table corresponding to the requested multicast program IP address, wherein the user port forwarding table records a port number of the port; and forwarding the video flow to the port recorded in the user port forwarding table.

16. The access apparatus of claim 15, wherein the access apparatus further performs the steps of:

detecting whether there are other users occupying other ports having applying the same video flow successfully;

if so, adding port numbers of the ports occupied by those users into the user port forwarding table.

17. The access apparatus of claim 15, wherein the access apparatus further performs the steps of:

detecting a state of a user device corresponding to the port of the access apparatus recorded in the user port forwarding table, and erasing the port of the access apparatus from the user port forwarding table when the user device can not receive the video flow.

* * * * *